United States Patent
Balestra et al.

(10) Patent No.: US 9,675,013 B2
(45) Date of Patent: Jun. 13, 2017

(54) WATERING DEVICE INTENDED TO BE FITTED TO A GROWING CONTAINER, COMPRISING AN INDEPENDENT RESERVOIR

(75) Inventors: Philippe Balestra, Levallois (FR); Bruno Canin, Saint-just (FR)

(73) Assignee: AQUASOLO SYSTEMS, Lyons (FR)

( * ) Notice: Subject to any disclaimer, the term of this patent is extended or adjusted under 35 U.S.C. 154(b) by 0 days.

(21) Appl. No.: 13/983,706

(22) PCT Filed: Jan. 11, 2012

(86) PCT No.: PCT/FR2012/050070
§ 371 (c)(1),
(2), (4) Date: Nov. 22, 2013

(87) PCT Pub. No.: WO2012/104512
PCT Pub. Date: Aug. 9, 2012

(65) Prior Publication Data
US 2014/0069000 A1    Mar. 13, 2014

(30) Foreign Application Priority Data
Feb. 4, 2011   (FR) ................................... 11 50911

(51) Int. Cl.
*A01G 27/02* (2006.01)
*A01G 27/00* (2006.01)

(52) U.S. Cl.
CPC ............ *A01G 27/02* (2013.01); *A01G 27/006* (2013.01)

(58) Field of Classification Search
CPC ....... A01G 27/02; A01G 27/006; A01G 29/00
USPC ........................................................ 47/48.5
See application file for complete search history.

(56) References Cited

U.S. PATENT DOCUMENTS

| | | | | | |
|---|---|---|---|---|---|
| 2,791,347 | A | * | 5/1957 | Boehm | 165/45 |
| 2,837,869 | A | * | 6/1958 | Chatten | 47/48.5 |
| 3,618,539 | A | * | 11/1971 | Daniels | 111/7.4 |
| 3,856,205 | A | * | 12/1974 | Rohling | 239/63 |
| 3,916,564 | A | * | 11/1975 | Crowell, Sr. | 47/48.5 |
| 4,115,951 | A | * | 9/1978 | Becker et al. | 47/81 |

(Continued)

FOREIGN PATENT DOCUMENTS

| EP | 0195542 A1 | 9/1986 |
|---|---|---|
| EP | 0467789 A1 | 1/1992 |

(Continued)

OTHER PUBLICATIONS

International Search Report issued May 30, 2012—re: PCT/FR2012/050070; citing: GB 2 378 633 A, FR 2 827 120 A1, EP 0 467 789 A1, FR 2 322 533 A1 and EP 0 195 542 A1.

*Primary Examiner* — Monica Williams
*Assistant Examiner* — Jessica Wong
(74) *Attorney, Agent, or Firm* — Cantor Colburn LLP

(57) ABSTRACT

Device for watering plants configured to fit into a growing container, such as a pot. The device includes an external casing intended to be placed inside the growing container and to be at least partially buried. The casing delimits a housing having an open top end intended to protrude from or lie flush with the soil, and a bottom end having a passage in the soil. The device is further equipped with a water reservoir positioned inside the housing and having an orifice around which a water diffusion system is removably mounted. The diffusion system is designed to pass through the passage of the casing.

9 Claims, 4 Drawing Sheets

(56) References Cited

U.S. PATENT DOCUMENTS

| | | | | |
|---|---|---|---|---|
| 4,705,218 A | * | 11/1987 | Daniels | 239/271 |
| 5,322,085 A | * | 6/1994 | Prothe | 137/614.2 |
| 7,240,457 B1 | * | 7/2007 | Chang | 47/48.5 |
| 2004/0181999 A1 | * | 9/2004 | Amsellem | 47/48.5 |
| 2006/0032119 A1 | * | 2/2006 | Amsellem | 47/48.5 |
| 2008/0005960 A1 | * | 1/2008 | King | 47/48.5 |
| 2014/0283445 A1 | * | 9/2014 | Chabot | 47/48.5 |

FOREIGN PATENT DOCUMENTS

| | | |
|---|---|---|
| FR | 2322533 A1 | 4/1977 |
| FR | 2827120 A1 | 1/2003 |
| GB | 2378633 A | 2/2003 |
| WO | 03007697 A1 | 1/2003 |

* cited by examiner

WATERING DEVICE INTENDED TO BE FITTED TO A GROWING CONTAINER, COMPRISING AN INDEPENDENT RESERVOIR

The invention relates to a device for watering plants, intended to equip a growing container.

Growing plants in an urban medium or inside buildings is generally achieved in growing containers, such as pots with a circular or rectangular section. The watering of the thereby grown plants should be regular and achieved with particular care. In order to facilitate and space out this watering, the use of containers is known which integrate a watering device such as a reserve of water.

When a growing container does not integrate such a device, the use on a one-off basis of a watering device is known, such as the one described in document EP 1406480. Such a device appears as a water diffusion system having means for connecting to a bottle of water.

Thus, during an extended period of absence preventing any watering, the device is connected to a bottle filled with water. The thereby provided device is then placed in the growing container in contact with the soil. In this way, the device all along the period of absence, will allow gradual and continuous supply of the plant with water from the water of the bottle.

Nevertheless, if such a device allows watering of the plant during a one-off absence period, it is not adapted for a permanent installation. Indeed, such a device does not allow an integrated and aesthetical installation because of the necessary presence of a water bottle jutting out from the growing container.

The present invention aims at finding a remedy to this drawback.

One of the objects of the invention is therefore to provide a watering device permanently and in an integrated way, fitting out a growing container not pre-equipped with a watering device.

For this purpose, the invention relates to a device for watering plants intended to equip a growing container, such as a pot or a garden box, said device comprising:
- an outer casing intended to be positioned in the growing container and to be buried, said casing delimiting a housing having an open upper end intended to be flush with the surface of the soil, and a lower end, opposite to the first, having a passage in the soil,
- a water reservoir removably positioned in the housing and having an orifice around which a first attachment means is made,
- a water diffusion system having a second attachment means complementary to the first attachment means, so as to attach the diffusion system to the water reservoir communicating with the orifice of the water reservoir, said diffusion system being laid out for crossing the passage of the outer casing.

The use of an at least partly buried outer casing combined with a water reservoir which is housed therein, allows a growing container to be equipped in an integrated and aesthetical way. Indeed, as such a device may be partly buried, the water reservoir does not jut out from the growing container.

Advantageously, the water reservoir has a shape mating that of the housing of the outer casing.

Such mating of shapes between the water reservoir and the casing gives the possibility of providing a compact watering device.

Advantageously, the casing has a side wall which, connecting the upper and lower ends, has a curved portion having a horizontal section with the general shape of a circular arc.

Such a curved portion gives the possibility of installing the device in a growing container having a circular or oval horizontal section, the curved portion being able to be positioned so as to bear upon the internal wall of the growing container.

Preferentially, the casing has a side wall connecting the upper and lower ends; said side wall has a portion including at least two side surfaces, approximately forming an angle of 90° relatively to each other.

Such surfaces forming an approximate angle of 90° give the possibility of installing the device in a container having a rectangular or square horizontal section, the device being able to be placed at an angle of the growing container, each surface in contact with one of the sides forming the angle of the container.

Advantageously, the side surfaces each have an edge opposite to the angle formed by said surfaces, both of these edges being connected through the curved portion.

Such a combination allows installation of the device in growing containers having both a horizontal section of a circular shape and of a square or rectangular shape.

Advantageously, the water diffusion system has a porous portion, for example in ceramic.

Such a porous portion allows a flow of water which is continuous for a regular supply of the plant.

Advantageously, the porous portion has a general conical shape.

Such a conical portion allows optimized diffusion of water into the soil.

Preferentially, the first and second means for attaching the water diffusion device are removable.

Such removable attachment means give the possibility of changing the water diffusion system in order to adapt the device to the watering need of the plant(s) received in the equipped growing container.

Advantageously, the first and second attachment means respectively include a threaded tubular portion laid out around the orifice of the water reservoir and a threaded tubular portion laid out on the water diffusion system.

Such first and second attachment means allow a removable attachment of the water diffusion device onto the water reservoir, which is robust and inexpensive.

Advantageously, the casing has a horizontal section, the surface of which substantially decreases between the upper and lower ends.

Such a section facilitates the driving in of the device during its placement in the growing container.

Preferentially, the casing has stiffening ribs oriented substantially vertically.

Such ribs allow stiffening of the casings which may then be made in a synthetic material of small thickness.

Advantageously, the water reservoir has an open end and a lid laid out so as to close this open end.

Such an open end gives the possibility of facilitating the filling of the water reservoir.

In any case, the invention will be better understood by means of the following description with reference to the appended schematic drawing illustrating as a non-limiting example, an embodiment of this watering device.

FIG. 1 is a perspective view thereof;
FIG. 2 is a sectional side view thereof;
FIG. 3 is an exploded perspective view thereof;

Figure 1:
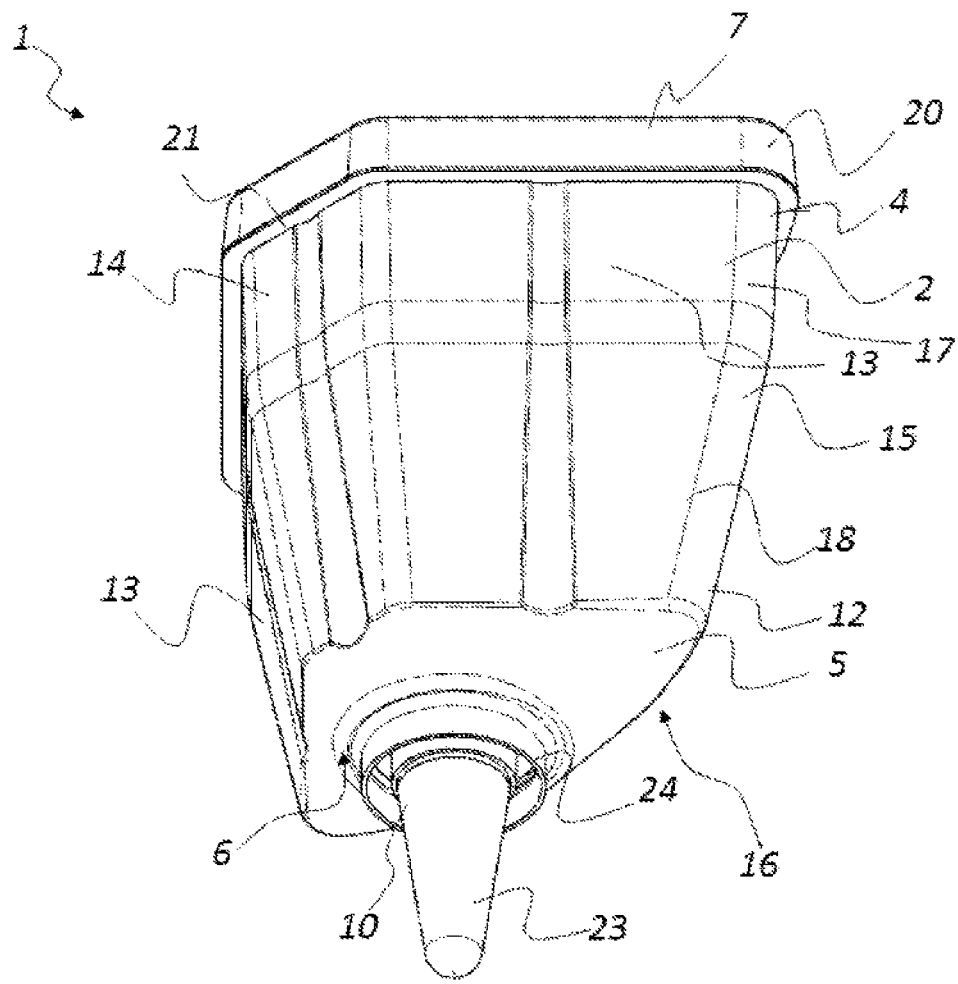
FIG. 1 illustrates a watering device 1 intended to equip a growing container R, such as pot.

This device 1 comprises:
- an outer casing 2 delimiting a housing 3 and having an open upper end 4 and a lower end 5 having a passage 6,
- a water reservoir 7 positioned in the housing 3 and having a lower orifice 8 and an upper open end 9,
- a water diffusion system 10 mounted on the water reservoir 7, communicating with its orifice 8,
- a lid 11 closing the open end 8 of the water reservoir 7.

The casing 2, in a synthetic material, includes as illustrated in FIG. 1, a side wall 12 connecting together the upper 4 and lower 5 ends. The side wall 12 includes two side surfaces 13 approximately forming an angle of 90° relatively to each other. Both side surfaces 13 are connected to each other through an intermediate surface 14 forming a truncation of the angle formed by both side surfaces 13. The side surfaces 13 each have an edge 15 opposite to the angle. The edges 15 of the side surfaces 13 are connected through a curved portion 16. The curved portion 16 has a horizontal section with the general shape of a circular arc.

Figure 2:
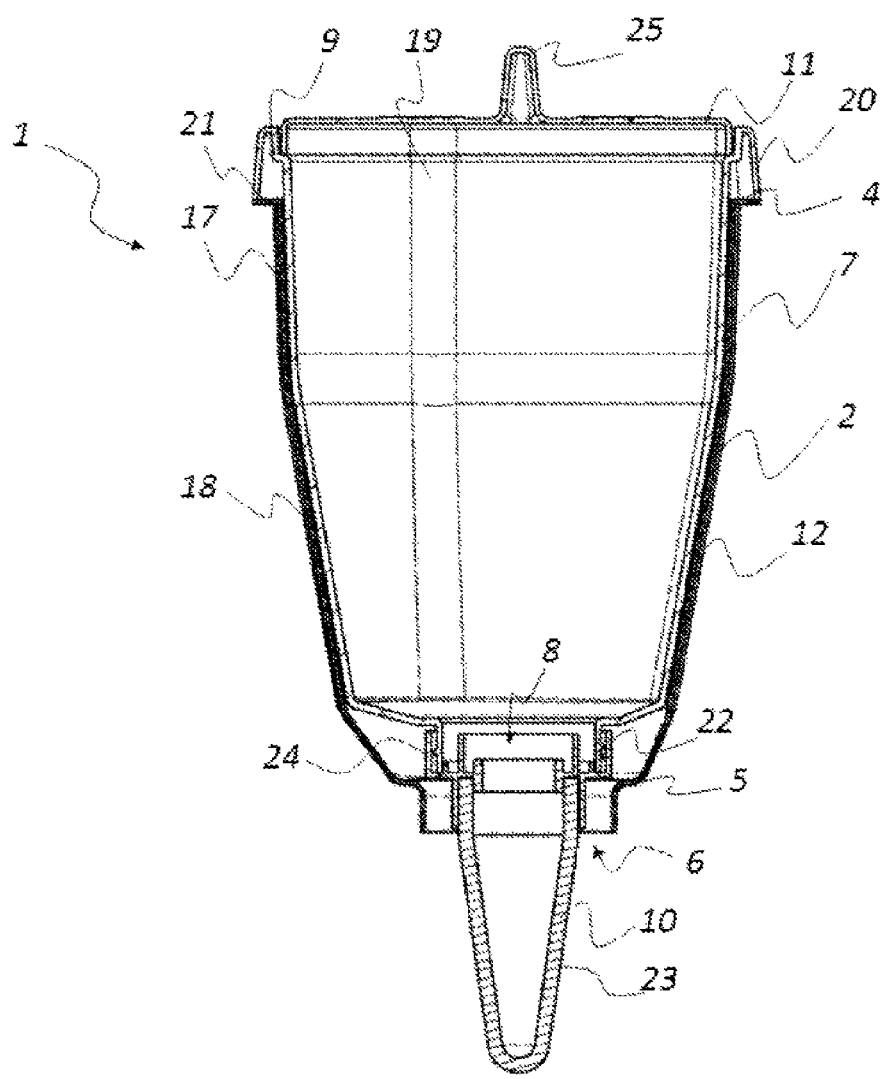

The side wall 12 has, as illustrated in FIG. 2, a first upper portion 17 having a constant horizontal section and a lower portion 18, in the continuity of the upper portion 17, having a horizontal section, the surface of which continuously decreases towards the lower end 5.

The side wall 12 has stiffening ribs/grooves 19 substantially oriented vertically.

The passage 6 present at the lower end 5 of the casing 2 is of circular shape in order to allow the passing of the water diffusion system 10.

The side wall 12 delimits with the upper 4 and lower 5 ends of the outer casing 2 the housing for the water reservoir 7.

Figure 3:
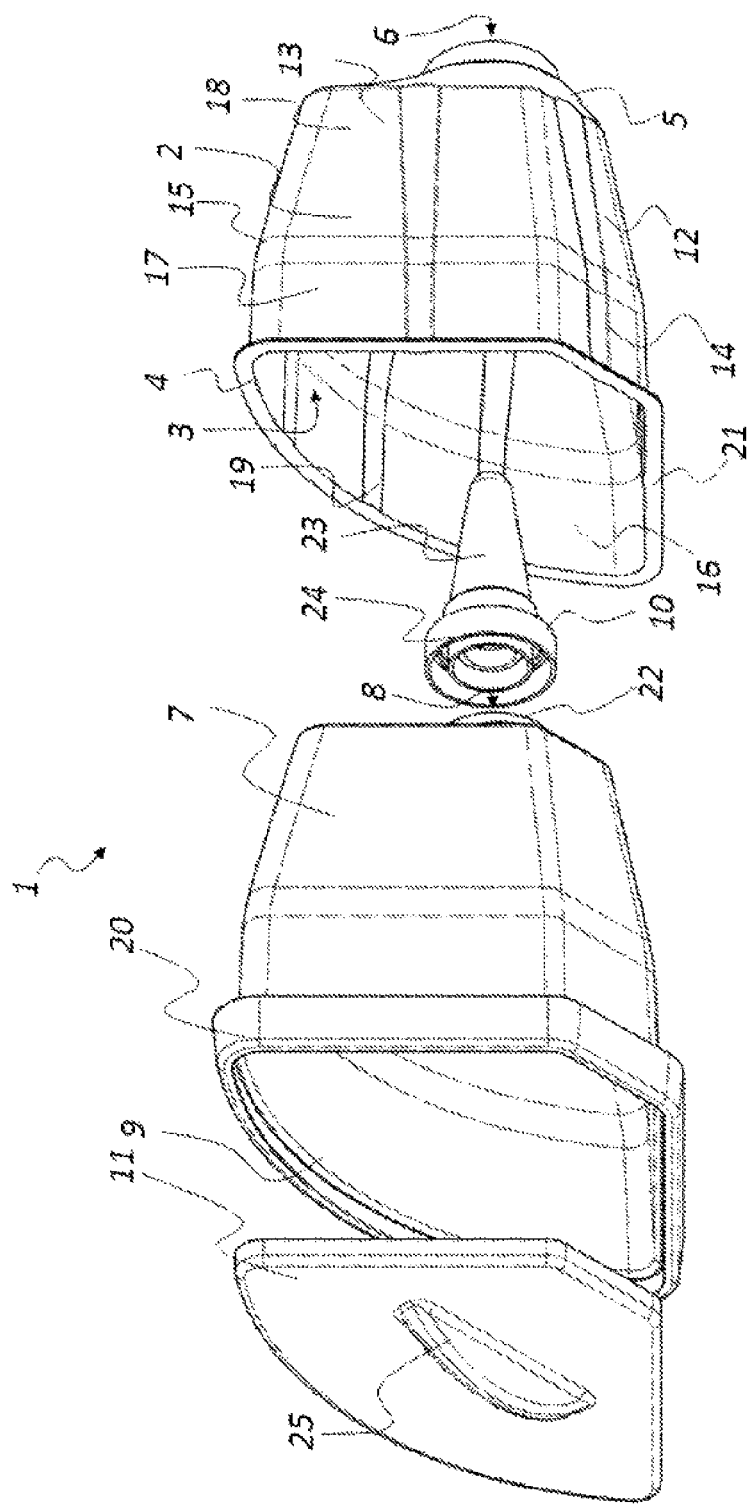

The water reservoir 7, also made in a synthetic material, has, as illustrated in FIG. 3, a shape mating that of the housing 3 so as to be received therein. The water reservoir 7 includes, at the open end 9, returns 20 which will bear upon the edges 21 of the upper end 4 of the casing 2.

The water reservoir 7 includes a threaded tubular portion 22 around the orifice 8 in order to allow attachment of the water diffusion system 10.

The water diffusion system 10 is a water diffusion system 10 similar to the one described in document EP 1406480. The water diffusion system 10 includes a porous portion 23 with a general conical shape, made in ceramic. The water diffusion system 10 further includes a threaded tubular portion 24 conformed in order to cooperate with the threaded tubular portion 22 of the water reservoir 7.

The threaded tubular portion 22 of the water reservoir 7 and the threaded tubular portion 24 of the water diffusion system 10, respectively form the first and second means for attaching the water diffusion system 10 onto the water reservoir 7.

The lid 11 is laid out so as to close the open end 9 of the water reservoir 7. The lid 11 has a grip handle 25 allowing it to be handled.

The installation of the device 1 may be achieved upon planting a plant into the soil in a growing container 9 or be achieved subsequently in a flowing container R already provided with one or several plants.

Figure 4:
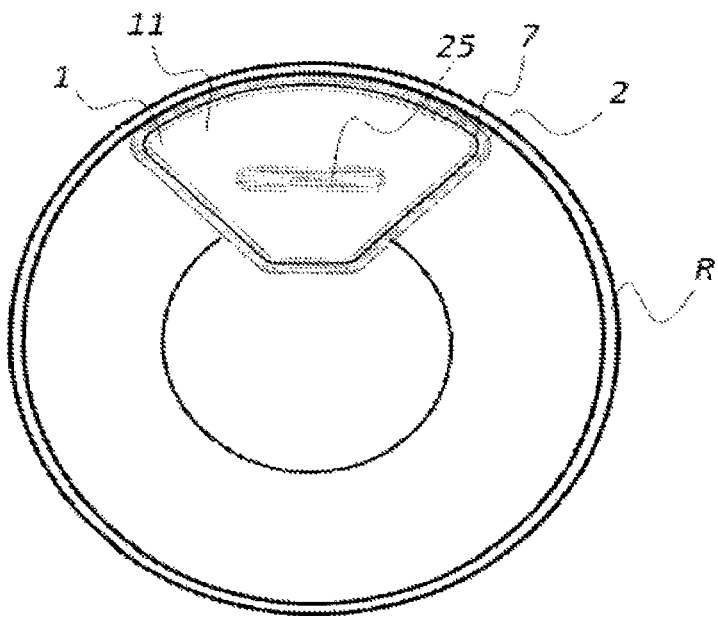
FIG. 4 is a top view of a growing container of circular section equipped with a watering device.

In the first case, the growing container R is partly filled with earth so that the device 1 may rest on the earth. In the case when the growing container R has a circular horizontal section, as shown in FIG. 4, the device is positioned in the growing container R so that the curved portion 16 bears upon the internal wall of the container and so that the lower end 5 of the outer casing 2 bears upon the soil.

Figure 5:
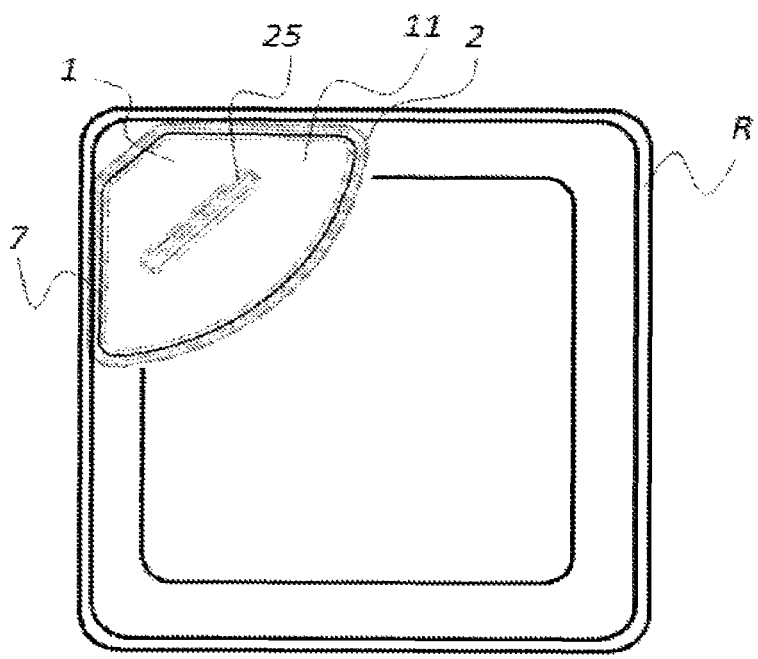
FIG. 5 is a top view of a growing container with a square section, equipped with a watering device.

In the case when the container has a rectangular or square section, as shown in FIG. 5, the device is positioned in the growing container R so that each side surface 13 bears upon one of the sides forming an angle of the container and so that the lower end 5 of the outer casing 2 bears upon the soil.

Thus, the water diffusion system 10, crossing the passage 6 made at the lower end 5 of the outer casing 2, is in direct contact with the soil. Once the device 1 is in place, the plant may be positioned in the growing container R and the filling of the growing container R with earth may be completed so as to have the upper end 4 of the outer casing 2 lie flush therewith.

In the case when the installation is achieved in a growing container R already provided with a plant, a portion of the earth is removed at the location intended for the device 1. The device 1 is then placed according to a position similar to the one described in the first case. Once the device 1 is in place, a portion of the removed earth is reintroduced into the growing container R so as to bury the device 1 so as to allow the upper end 4 of the outer casing 2 lie flush therewith.

As this is obvious, the invention is not limited to the sole embodiment of this watering device, described above as an example, on the contrary it encompasses all the alternative embodiments. Thus notably the water diffusion system may assume another shape and include a system of the dripping type different from a cone-shaped porous portion.

The invention claimed is:

1. A device for watering plants configured to equip a growing container, said device comprising:
   a growing container,
   an outer casing positioned in the growing container and at least partly buried, said casing having an open upper end jutting out from or lying flush with a soil, and a lower end having a passage in the soil,
   a water reservoir removably positioned in the casing and having an orifice around which a first attachment means is positioned,
   a water diffusion system having a second attachment means mating the first attachment means, so as to attach the diffusion system to the water reservoir communicating with the orifice of the water reservoir, said diffusion system being laid out so as to cross through the passage of the casing,
   the casing having a side wall connecting the upper and lower ends; the side wall having a curved portion which has a horizontal section with the general shape of a circular arc, the curved portion positioned so as to bear upon the internal wall of the growing container, the side wall including at least two side surfaces, approximately forming an angle of 90° relatively to each other, said side surfaces each having an edge opposite to the angle formed by said surfaces, both of these edges being connected through the curved portion.

2. The device according to claim 1, wherein the water reservoir has a shape mating that of the casing.

3. The device according to claim 1, wherein the water diffusion system has a porous portion.

4. The device according to claim 3, wherein the porous portion has the general shape of a cone.

5. The device according to claim 1, wherein the first and second means for attaching the water diffusion device are removable.

6. The device according to claim 5, wherein the first and second attachment means respectively include a threaded tubular portion made around the orifice of the water reservoir and a threaded tubular portion made on the water diffusion system.

7. The device according to claim 1, wherein the surface of the horizontal section tapers between the upper end and the lower end.

8. The device according to claim 1, wherein the casing has stiffening ribs substantially oriented vertically.

9. The device according to claim 1, wherein the water reservoir has an open end and a lid laid out for closing this end.

\* \* \* \* \*